United States Patent [19]

Ryan

[11] 4,312,014
[45] Jan. 19, 1982

[54] INPUT VIDEO PROCESSOR FOR COLOR TELEVISION CAMERAS

[75] Inventor: John O. Ryan, Cupertino, Calif.

[73] Assignee: Ampex Corporation, Redwood City, Calif.

[21] Appl. No.: 139,508

[22] Filed: Apr. 11, 1980

[51] Int. Cl.³ .......................................... H04N 9/535
[52] U.S. Cl. ..................... 358/41; 358/163; 358/174
[58] Field of Search ............... 358/160, 161, 163, 166, 358/174, 221, 222, 41, 44, 48, 50, 43

[56] References Cited

U.S. PATENT DOCUMENTS

| | | | |
|---|---|---|---|
| 3,600,511 | 8/1971 | Cooksey | 358/221 |
| 3,651,255 | 3/1972 | Kubota | 358/221 |
| 4,104,678 | 8/1978 | Van Roessel | 358/160 |
| 4,148,069 | 4/1979 | Smiley | 358/160 |
| 4,240,103 | 12/1980 | Poetsch | 358/163 |

Primary Examiner—Michael A. Masinick
Attorney, Agent, or Firm—George B. Almeida; Joel D. Talcott

[57] ABSTRACT

An input video processor utilizes the characteristics of a modulator having two differential pairs of transistors with respective gain control terminals, in combination with a switch. The processor performs four distinct functions utilizing the same basic modulator; it provides blanking the video signal from the preamplifier to provide a clean pulse for clamping at a later stage; it clamps the output during black level firmly to ground potential to allow subsequent blanking; it allows the manipulation of the master gain of the three channels in a color television while independently adjusting the gain of the channels, while further maintaining absolute tracking between channels; and it provides an independent gain control input for a white shading control voltage input to perform white shading corrections.

16 Claims, 3 Drawing Figures

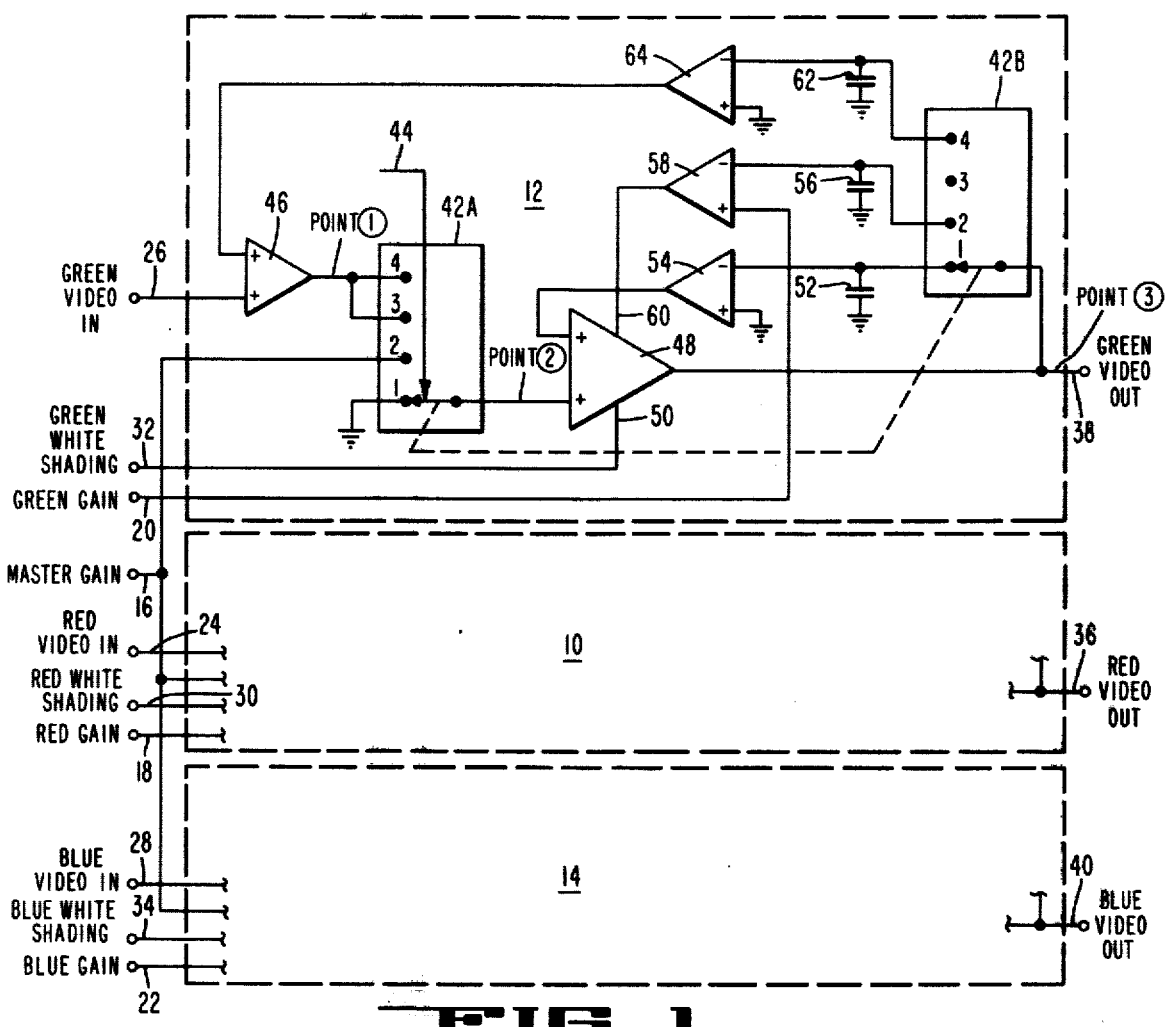
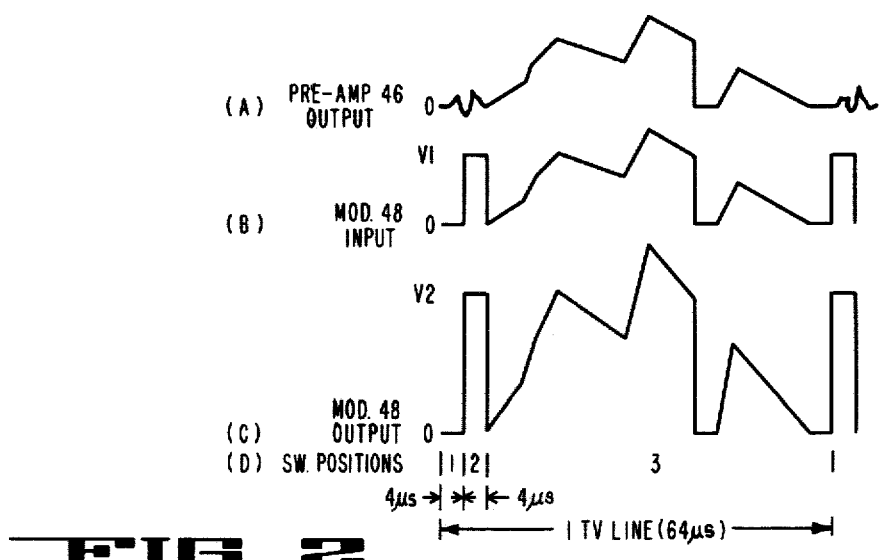

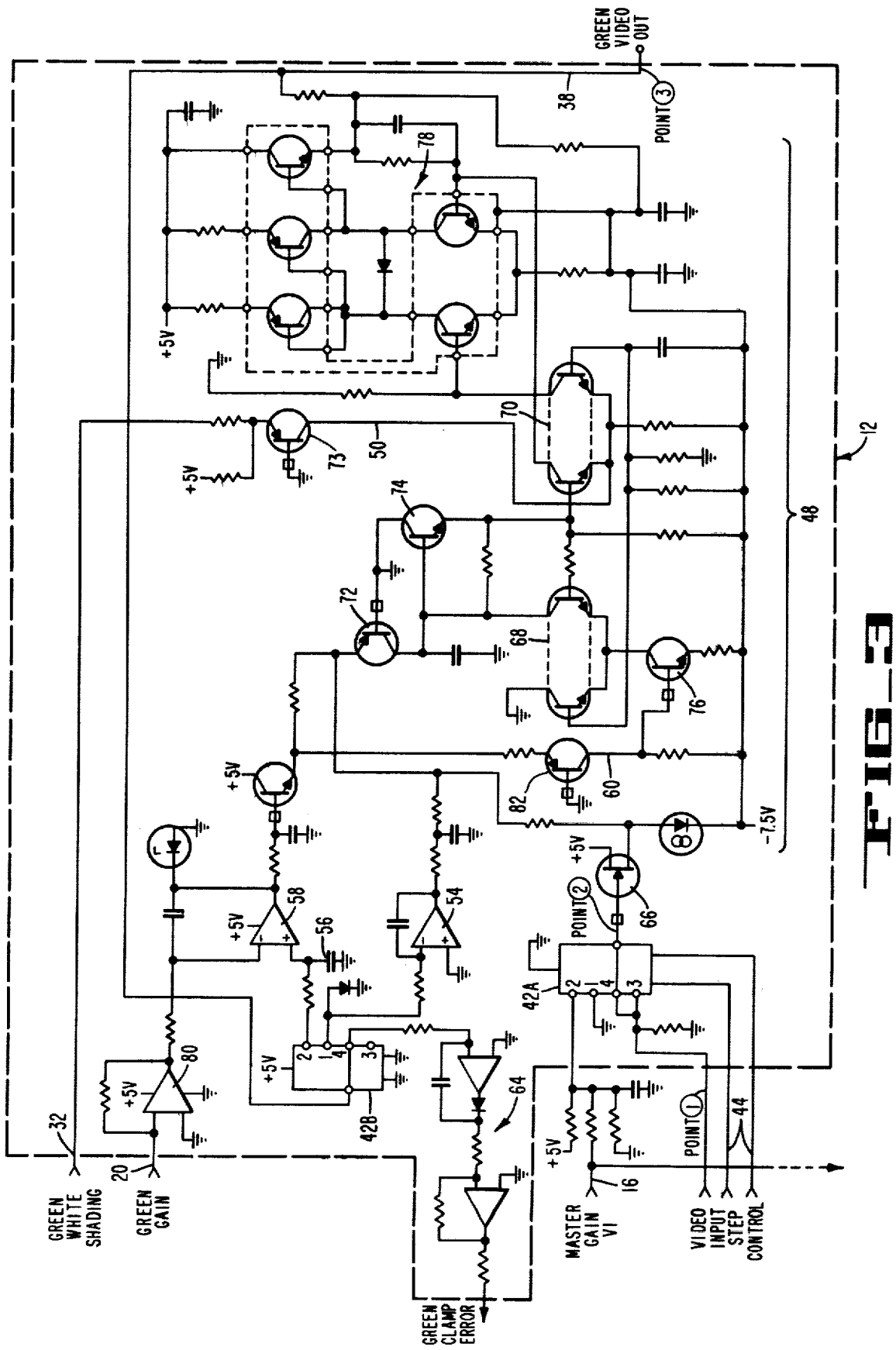

INPUT VIDEO PROCESSOR FOR COLOR TELEVISION CAMERAS

BACKGROUND OF THE INVENTION

The invention relates to an input video processor circuit and particularly, to an input video processor with a gain control circuit, which independently manipulates the master gain and the individual gain of different channels while providing blanking, black level clamping and white shading.

Prior art color television cameras require various circuits for manipulating the gains of the red, green, and blue channels by similar amounts while allowing manipulation of the master gain of the processor over a selected range. In addition, further circuitry is required to provide black level clamping, blanking prior to clamping to provide a clean pulse level, and white shading adjustments to compensate for the non-uniformity of the camera tube sensitivity. In instances where the light available to a camera begins to decrease and the iris of the camera cannot compensate for the reduction of light, gain control circuits are utilized to increase the electronic gain of the system. Typical prior art video processor circuits of cameras presently available, allow the adjustment of electronic gain in two or three steps using for example zero, 6 decibels (db) which is a factor of two, and 12 db which is a factor of four.

A classic problem in typical input video processors, is that referred to as clamp noise. This is caused by the fact that cameras normally use high speed horizontal rate clamps to try and stabilize the black level to remove hum and tilt from the picture due to AC couplings, and the like. In so doing, the inherent noise that is generated by the preamplifier is converted to undesirable low frequency noise by the sampling system.

By way of example only, a typical prior art input video processor circuit is utilized in the Ampex color camera model number BCC-10, described in the Ampex Manual Broadcast color camera system, catalog #1809339-01, August 1979.

SUMMARY OF THE INVENTION

The present invention provides means for overcoming the shortcomings of previous mention of typical prior art input video processors, while providing a very simple circuit utilizing a single modulator in each channel of a color television camera to perform the blanking, clamping, gain control and white shading functions.

To this end, the red, green and blue channels of a television camera employ identical input video processors. A master gain control line is coupled to the inputs of each, while individual red, green and blue gain control lines are coupled to respective circuits. The processor of each channel has a video input and a video output, an individual gain control and a shading input. The video signal is applied to a four-position electronic switch that sequences at a very high rate between the four positions during one television line. A single modulator, formed of two differential pairs of transistors, includes a respective pair of separate gain control terminals, and is coupled at one of its inputs to an input half of the four position switch. The output of the modulator provides the video output, which is fed back to the second input of the modulator via an output half of the switch and an amplifier. Both the input and output portions of the switch have four contact positions which step together. Thus, in the input portion of the switch, the first position is grounded, the second position is coupled to the master gain control voltage, and the third and fourth positions are coupled to the video signal via one input of a video preamplifier. The output portion of the switch includes four corresponding positions; the first switch position is coupled to the second input of the modulator via a amplifier, the second position is coupled to a gain control terminal of the modulator via another amplifier, the third position is open, and the fourth position is coupled back to the second input of the video preamplifier via a third amplifier.

Placing the switch in the first position provides for clamping the output during black level firmly to ground. The second position provides for the independent adjustment of the individual channel gains and the master gain. The third position ties the video input through the modulator to the output thereof, and the fourth position provides for clamping to a precise ground potential during the active period of the video lines during vertical blanking interval.

Thus, it is an object of the invention to provide a very simple gain control circuit for continuously adjusting the master gain of a camera while maintaining absolute tracking between channels.

It is another object to provide an input video processor circuit which performs multiple functions of blanking, clamping, master and individual gain control and white shading.

A further object is to provide an input video processor utilizing a single modulator and a four position switch which sequences between positions to perform the functions of blanking, clamping, gain control and white shading.

Still another object is to provide a single modulator per channel, wherein master and individual gain adjustments are made via one gain control terminal thereof, and white shading is made via a second gain control terminal.

BRIEF DESCRIPTION OF THE DRAWINGS

FIG. 1 is a block diagram of an input video processor circuit used in the green, red and blue channels of a color television camera.

FIG. 2 is a graph depicting waveforms generated at various points in the circuits of FIG. 1.

FIG. 3 is a schematic diagram depicting one implementation of the input video processor of FIG. 1.

DESCRIPTION OF THE PREFERRED EMBODIMENTS

Referring to FIG. 1, the red, green and blue channels of a color television camera include respective red, green and blue input video processors 10, 12 and 14 of description herein. The processors are provided with a master gain control voltage V1 via a common input terminal 16, and individual red, green and blue channel gain control voltages RDV2, GRV2 and BLV2 via respective input terminals 18, 20 and 22. The video component signals red, green and blue are provided to respective processors 10, 12 and 14 via video input terminals 24, 26 and 28. Red, green and blue white shading control voltages are introduced to respective channels via red, green and blue white shading terminals 30, 32 and 34. The input video processors 10, 12 and 14 of the respective channels provide red, green and blue video signal outputs on respective output terminals 36, 38 and 40.

Since the input video processor circuits in the three channels are identical, only the processor 12 of the green video channel will be described herein to simplify the description.

To this end, a very high speed, two-pole, four-position electronic switch 42 includes an input set of contacts 42A at the input, and an output set of contacts 42B at the output, of the processor circuit 12. For simplicity, the input portion of the switch hereafter will be termed an input switch 42A, while the output portion will be termed an output switch 42B. Both the input and output switches include corresponding contact positions 1, 2, 3, and 4. The two halves of the switches are stepped together through the positions 1-4 via a pair of control lines 44 which supply the switches with four possible binary states corresponding to the respective positions 1 through 4. The binary states are supplied via the camera system sync generator (not shown) and are related to vertical and horizontal sync.

Position 1 of the input switch 42A is coupled to ground, position 2 is coupled to the master gain control voltage V1 via the common input 16, and positions 3 and 4 are tied together and are coupled to the green video signal input 26 via a generally conventional preamplifier 46. The common side of the input switch 42A is coupled to a modulator 48, which is formed of two differential pairs of transistors, which include two gain control terminals whose gains are controlled by manipulating the respective emitter currents. One of the gain control terminals 50, is coupled to the green (channel) white shading input 32. The output of the modulator 48 is coupled to the green video output 38.

The output of the modulator 48 is also coupled to the common side of the output switch 42B. The position 1 of output switch 42B is coupled to a capacitor 52, and also to the negative input of an idealized operational amplifier 54 with very high gain, whose positive input is grounded and whose output is coupled to the second input of the modulator 48. The position 2 is coupled to a capacitor 56, and also to the negative input of a low frequency, DC amplifier 58, whose positive input is coupled to the gain control voltage V2 on input 20 and whose output is coupled to a second gain control terminal 60 of the modulator 48. The position 3 of the output switch 42B is left open, and the position 4 thereof is coupled to a capacitor 62, and also to the negative input of a high gain amplifier 64, whose positive input is grounded and whose output is fed to a second input of the video preamplifier 46.

In operation, the green channel video signal component is applied to the video input 26, and the various gain and shading control voltages are provided via respective inputs to the green channel input video processor 12. The input switch 42A is supplied with the binary state which selects both switch positions 1, whereby the input of the modulator 48 is coupled to ground, and its output is coupled to the capacitor 52, to the amplifier 54, and thence back to the second input of the modulator. The stepping sequence of the switch 42 through positions 1, 2 and 3 is performed synchronously with the scanning of each television line, while the sequence through positions 1, 2 and 4 is performed during the television lines within the vertical blanking interval, for reasons described below.

Thus, in FIG. 2D a time interval of one television line of 64 microseconds ($\mu s$) is depicted, wherein the time durations of the switch positions 1 through 3 are also depicted. The waveforms generated at specific points 1, 2 and 3 of the circuit 12 are also shown. Point 1 corresponds to the output of the video preamplifier 46, i.e., the input to the input switch 42A; point 2 corresponds to the input of the modulator 48; and point 3 corresponds to the modulator output and thus to the input video processor output 38. The waveforms corresponding to points 1, 2 and 3 are depicted in FIGS. 2A, 2B and 2C respectively.

Referring to FIGS. 1 and 2, and the input switch 42A, during the horizontal blanking interval, the switch 42A spends approximately the first four microseconds at switch position 1. Therefore, during that period of time, the input voltage at point 2 to the modulator 48 is at ground since position 1 is tied to ground (FIG. 2B). For the next four microseconds of the blanking interval, the switch is at position 2 and is thus tied to the master gain control input 16, and thus point 2 of the input to the modulator input 48 is tied to the master gain DC voltage V1. As depicted in FIG. 2B, the input to the modulator 48 goes from zero to some value V1.

The switch 42A is then stepped to position 3, and as shown in the FIG. 2, resides there for the entire remainder of the television line. Since position 3 is tied to the video input signal via the preamplifier 46, the input to the modulator 48, point 2, sees the incoming (green) video signal for the remainder of the line.

The output switch 42B tracks the input switch 42A whereupon, during the first four microseconds of the horizontal blanking interval, the capacitor 52 is charged to the potential of the modulator 48 output. The capacitor 52 is coupled to the high gain operational amplifier 54, whereby the output 38 is clamped to ground potential during the first four microseconds. Thus the measured voltage across the capacitor is compared to ground potential, and any difference is applied as a DC offset back to the second input of the modulator 48. This provides, in essence, a feedback clamp that, during the first four microseconds of the blanking interval, holds the output 38 of the processor (point 3) at ground potential by summing an error voltage with the video signal to the modulator (FIG. 2C).

During the second four microseconds, the switch 42B also is in position 2, whereby capacitor 56 is charged to the voltage thereon, which depends upon the gain since the voltage at the input to the modulator 48, point 2, went from ground to some value V1. At point 3, the modulator output 38, the voltage goes from ground to some other value depending upon the gain of the amplifier 58. Since the object of the processor when in position 2 is to control this gain, the processor circuit 12 compares the voltage during the second four microseconds, with a reference voltage V2 herein corresponding to the individual gain control voltage (in this example input 20 of, the green gain control). Any difference between the voltages is amplified by the infinite gain amplifier 58, and the error is fed back to the gain control terminal 60 of the modulator 48.

Accordingly, referring to FIG. 2C, during the first four microseconds the video output 38 is clamped to ground; during the second four microseconds the gain is adjusted to make the output equal to V2, which is the green channel gain control voltage. It follows that is an input signal to the processor goes from zero to V1 and produces an output signal that goes from zero to V2, the processor gain is simply V2/V1.

Thus there are two ways in which the gain of the circuit may be changed. First, the individual channel gain control voltage V2 can be changed; for example, if V2 is doubled the output voltage is doubled, since if it does not, a corresponding feedback voltage will be applied to manipulate the gain of the modulator 48 to cause it to double. Thus the gain of the circuit is directly proportional to the channel reference voltage V2. Secondly, the gain of the circuit is inversely proportional to the master gain control voltage V1, because V2 at the output point 3, must still be held. Thus the input level drops by a factor of 2, while the output remains constant at V2. This can happen only if the gain is doubled. Thus it follows that reducing the control voltage on the master gain input 16 by half doubles the gain, and conversely, doubling the control voltage V1 reduces the gain by half. Accordingly, there is a reciprocal relationship between the master gain control voltage V1 and the actual circuit gain, and a direct relationship between the individual circuit gain control voltage V2 and the actual gain. Thus the circuit gain can be independently controlled by changing V2 the individual gain, or by changing V1 the master gain. Since the master gain is common to all 3 channels, regardless of what individual gain is set in each channel by the respective gain control voltages V2, any change in the master gain control voltages V1 causes an inversely proportional change in the gain of each channel.

Thus the input video processor of description herein, utilizes a single modulator 48 per channel, which is manipulated by two independent control voltages to provide independent control of the master and individual gains of the circuit.

Inherent in the fact that the video signal passes through the input switch 42A is the fact that it also is blanked, since during the first four microseconds when switch 42A is in position 1, and for the second four microseconds when it is in position 2, video is not supplied to the circuit. Thus blanking automatically is achieved. In FIG. 2A, during the switch position 1, the video from the preamplifier 46 during horizontal blanking interval is depicted, which includes the usual noise due to crosstalk in the scanning system. However, at the output, i.e., at point 3, there is a clean pulse that may be used later in the circuit for such things as further clamping, etc.

To sidetrack for a moment, in television cameras there is a classic problem generally referred to as clamp noise. This is caused by the fact that cameras normally use high speed horizontal rate clamps to try and stabilize the black level to remove hum in the picture and tilt due to AC couplings, and the like. In doing so, the inherent noise from the preamplifier is converted to undesirable low frequency noise by the sampling system. Thus, before a video signal in the camera can be blanked, the black level voltage must be carefully established. If the level is not firmly established but is allowed to fluctuate, the blanking level will also fluctuate undesirably.

In the processor of description herein, the problem has been avoided by not requiring a horizontal rate clamp, but by carefully DC coupling the amplifiers prior to the processor circuit. However, some form of clamp to establish the black level is required, in case of possible DC drifts that may have occurred prior to the processor circuit. Accordingly, the processor herein utilizes a vertical rate clamp for establishing black level, which is accomplished by directing the switch 42 to the positions 4. Position 4 is selected via the corresponding binary state on the control lines 44, during the vertical blanking interval of the active period of the video lines.

Thus, in NTSC television standard systems, there are on the order of 20 lines in the vertical blanking interval where video information is not available. At the beginning of each of these 20 lines the switch 42 is still cycled through positions 1 and 2 during the first and second four microseconds respectively, but for the remaining portion of each of the 20 lines, during the vertical blanking interval, the switch is placed in position 4. The video output 38 is at black level during this time since the beams are cut off due to the system being in the vertical blanking interval. Thus the black level is compared again with ground potential via the high gain amplifier 64, and any error is fed back to be summed into the video preamplifier 46. This insures that the voltage corresponding to black level, at point 1 of the preamplifier 46, is precisely at ground potential. This achieves the clamping function necessary at this point before blanking is accomplished.

Since switch positions 3 and 4 are tied together at the input switch 42A, the amplifier sees the video in both positions and can provide a measurement of the video when it is known that it should be at black level, namely, during the vertical retrace period. Since zero volts at point 1 corresponds to zero volts at the output point 3 by virtue of the first feedback clamp during the first four microseconds, and since the output is clamped to zero during the true black level, the input will also be zero thereby providing a true black level.

White shading correction is necessary because of the inherent non-uniformity in the sensitivity of camera pickup tubes over their active picture area. For example, an even amount of light striking the face plate of the tube will not provide the same video level output as the image is scanned, because of slight differences in responsitivity of the target material. Also, in various and usually poor lenses, a "port-holing" effect is generated wherein the outer extremities of the picture are darker than the center portion. White shading adjustment corrects such conditions, and is controlled by manipulating the gain of the video channel on a line-by-line basis. Thus the gain is selectively increased as the scan proceeds from the left edge to the center of the picture, and is increased as the scan continues from the center to the right edge of the picture. Likewise, the gain is selectively adjusted to decrease from a high to a relatively low value and back to a high value again, as the scan moves down from the top through the middle and to the bottom of the picture.

The input video processors 10, 12 and 14 each employ the specific modulator 48 with two differential pairs of transistors, which includes thus the second gain control terminal 50 which is utilized for white shading. The green white shading control voltage is provided on input 32 and is fed to the second gain control terminal 50 of the modulator 48. Typically, the white shadow voltage defines the usual parabolic waveform, for example, a mixed line and field type parabolic waveform, which provides the white shading correction by correspondingly varying the gain during the scan across the picture to compensate for the non-uniformity of the previously discussed tube sensitivity. The white shading control utilizes the inherent feature of the processor viz, description herein, of insuring zero volts at the output of the circuit during blanking, as is further described with reference to the schematic of FIG. 3 infra.

The schematic of FIG. 3 depicts an implementation of the input video processor of FIG. 1, and particularly one of the identical circuits thereof (ie, the green channel processor 12). Similar components are similarly numbered in both FIGS. 1 and 3 with reference to the green channel.

Thus the input switch 42A is shown with the position 1 grounded, the position 2 coupled to the master gain control voltage V1 as at terminal 16, and with the positions 3 and 4 coupled to the point 1, ie, to the video preamplifier output. The preamplifier 46 of the block diagram is not depicted in FIG. 3, since it is generally common to the overall camera head system. The common connection of the input switch 42A defines point 2 of the FIG. 1, and is coupled to an input transistor 66 of the modulator 48.

As previously mentioned the input and output switches 42A, 42B track each other in response to the two control lines 44 whose four possible binary states determine the position of the switch. The logic states for the four positions are generated by the sync generator of the overall camera system in response to the conventional horizontal and vertical blanking signals. Thus, during the active video picture ie, the period when the system is not in the vertical blanking interval, the switch sequences between positions 1, 2 and 3 as the video scan lines are scanned. During the vertical blanking interval, the switch sequences between positions 1, 2 and 4.

The modulator 48 is defined by the two differential transistor pairs 68, 70, as well as by the associated input transistor 66, transistors 72, 74 and gain control terminals 50 and 60 coupled via transistors 73 and 76 to the emitters of the respective transistor pairs 70, 68. The modulator 48 also includes an output amplifier stage 78 which drives the following electronics via the processor output 38.

The operation of the schematic circuit of FIG. 3 was previously described with reference to the block diagram of FIG. 1. To reiterate, during the first four microseconds corresponding to position 1 of the switch 42, the input to the modulator 48 is grounded, and the high gain amplifier 54 compares the voltage of the modulator output to ground. The resulting DC error is fed back to manipulate the DC condition of the modulator 48. During the second four microsecond period, with the switch 42 in position 2, the modulator 48 input is coupled to the master gain voltage V1, and the output is coupled via the output switch 42B to the high gain amplifier 58 where the voltage held on capacitor 56 is compared with the individual channel gain control voltage V2 on input 20. An amplifier 80 is used to combine several remote and local individual gain control inputs, (not shown). Any error generated via the amplifier 58 is fed back into the respective gain control terminal 60 of the modulator 48, and particularly to a transistor 82 thereof, to control the collector current of the transistor 76 coupled to the first differential pair of transistors 68. The transistors 72, 74 provide a balancing input to insure that the DC offset in the modulator does not change as the gain is manipulated via the processor.

To achieve correct white shading, the video signals must be truly multiplied with a certain error signal corresponding to the shading signal. Thus when the video signal is zero, the shading signal should have no effect, if a pure multiplication process is performed. To achieve such an effect, the shading gain is controlled by manipulating the DC current to the second differential pair of transistors 70 of the modulator. The white shading control is supplied via the transistor 73 corresponding to the gain control terminal 50, and manipulates the emitter current of the differential pair 70 to control the gain. To provide such control and still have no effect on black level, it is essential that at black level the collector current of the differential pair of transistors be identical to prevent the shading waveform from producing an output. This condition is provided by the precision differential (output) amplifier 78 and its associated components, which by design produce only zero volts DC at the output whenever the collector currents of the transistors 70 are identical. As previously described, the processor feedback network of description herein, insures that the output of the circuit is at zero volts during blanking. Therefore it follows that the transistors 70 are precisely balanced during blanking since that is the only way that they generate the zero volt output previously established. Therefore, the circuitry insures that white shading correction does occur.

In position 3 of the switch 42, the video signal is supplied to the output 38 for the entire active video line. During position 4 of the switch 42, the modulator input receives the video signal, while the modulator output is coupled to the amplifier 64 wherein it is compared to ground potential, and any error is fed back to the preamplifier and is mixed in with the video, as previously described in FIG. 1.

What is claimed is:

1. A circuit for receiving a video signal derived in part via the horizontal line scans of a pickup tube in the red, green and blue channels of a video camera, and for selectively controlling the circuit gain in response to a gain control voltage and individual channel gain control voltages, comprising;
   a single modulator having a pair of inputs, a gain control terminal and an output and disposed in each red, green and blue channel, and responsive to the master gain control voltage; and
   feedback amplifier means selectively coupled from the output to the gain control terminal of the modulator and responsive to the respective individual channel gain control voltages independent of the master gain control voltage.

2. The circuit of claim 1 for further controlling white shading in each channel and including;
   a second gain control terminal in each modulator;
   a white shading voltage source coupled to the second gain control terminal;
   wherein the gain of each modulator is varied in response to the white shading voltages in the respective channels independent of the master and individual gain control voltage changes.

3. The circuit of claim 1 wherein the circuit gain thereof has a reciprocal relationship in response to the master gain control voltage, and a proportional relationship in response to the individual channel gain control voltage.

4. The circuit of claim 1 further including;
   switch means selectively coupling the master gain voltage to the respective modulator; and
   switch stepping means coupled to the switch means for controlling the latter during selected time periods of the horizontal line scan.

5. The circuit of claim 4 wherein;
   the switch means further includes multiple contacts; and
   the switch stepping means includes an H-sync related signal source for stepping the switch means through the multiple contact positions for the selected time periods of the horizontal line scan.

6. The circuit of claim 5 wherein the switch means operatively couples the master gain voltage to the modulator and thence to the feedback amplifier means during the respective time period of the line scan to provide the individual gain voltage change independent of the master gain voltage.

7. The circuit of claim 5 further including:
a second feedback amplifier means operatively coupled from the output to the input of the modulator; and
wherein the switch means clamps the modulator input to ground during the respective time period in response to the H-sync related signal source.

8. The circuit of claim 5 further including;
preamplifier means coupled to the video signal;
third feedback amplifier means operatively coupled from the output of the modulator to the preamplifier means; and
wherein the switch stepping means further provides a vertical blanking signal, and the switch means clamps the video signal to ground via the third feedback amplifier means during the respective time period of the horizontal line scan during the vertical blanking in response to the switch stepping means.

9. A circuit for performing specific functions on each of the red, green and blue video components of a video signal supplied to the input video stage of the corresponding individual red, green and blue channels via the horizontal line scans of a pickup tube, wherein the input stages include preamplifiers, comprising the combination of;
a single modulator disposed in a respective channel and having inputs and an output and at least one gain control terminal;
feedback loop means operatively coupled from the output to a given input of the modulator; and
switch means having an input and output set of contacts coupled to the modulator input and output respectively, wherein the input and output contacts are intercoupled to step through the positions together in response to horizontal and vertical sync related control signals.

10. The circuit of claim 9 including;
switch stepping means coupled to the switch means for stepping same through the input/output contact positions for selected time periods during horizontal line scans.

11. The circuit of claim 10 for controlling the circuit gain by the application of a master gain control voltage and individual channel gain control voltages, wherein;
the master gain control voltage is coupled to a first input contact respective time period of the line scan;
the feedback loop means includes first amplifier means coupled from the modulator output via a corresponding first output contact and thence to the gain control terminal during the same time period; and
said first amplifier means is responsive to the respective individual gain voltage while precisely tracking the master gain voltage.

12. The circuit of claim 10 wherein;
the feedback loop means includes second amplifier means coupled to a second output contact and to reference ground, and thence to the modulator input; and
wherein a second input contact is coupled to ground to clamp the modulator output to ground during its respective time period of the line scan.

13. The circuit of claim 10 further including;
a third input contact coupled to the video signal via the preamplifier; and
the feedback loop means includes third amplifier means coupled to a third output contact and to reference ground, and thence operatively summed to the video signal via the respective preamplifier, to clamp the video signal to ground to provide a black level clamp for its respective time period of the line scan.

14. The circuit of claim 10 further including;
a fourth input contact operatively coupled to the video signal, while the fourth output contact is open.

15. The circuit of claim 10 for controlling white shading by application of a white shading control voltage, wherein;
the modulator includes a second gain control terminal; and
the white shading control voltage is coupled to the second gain control terminal to supply white shading correction during the respective active time period of the horizontal line scan.

16. The circuit of claim 10 wherein;
the switch stepping means includes a horizontal and a vertical blanking interval signal;
the first input/output contacts are closed in response to a first portion of the horizontal blanking interval signal;
the second input/output contacts are closed in response to a first portion of the horizontal blanking interval signal;
the third input/output contacts are closed during the active horizontal line scan in response to the vertical blanking interval signal; and
the fourth input/output contacts are closed during the active horizontal line scan.

* * * * *